(12) United States Patent
Wang et al.

(10) Patent No.: US 6,917,580 B2
(45) Date of Patent: Jul. 12, 2005

(54) FREQUENCY REUSE SCHEME FOR OFDM SYSTEM

(75) Inventors: Zhaocheng Wang, Stuttgart (DE); Richard Stirling-Gallacher, Stuttgart (DE); Thomas Dolle, Haar (DE); Ralf Böhnke, Esslingen (DE)

(73) Assignee: Sony International (Europe) GmbH, Berlin (DE)

( * ) Notice: Subject to any disclaimer, the term of this patent is extended or adjusted under 35 U.S.C. 154(b) by 890 days.

(21) Appl. No.: 09/919,263

(22) Filed: Jul. 30, 2001

(65) Prior Publication Data

US 2002/0034158 A1 Mar. 21, 2002

(30) Foreign Application Priority Data

Aug. 1, 2000 (EP) .............................................. 00116636

(51) Int. Cl.[7] ................................................ H04J 11/00
(52) U.S. Cl. ....................... 370/203; 370/343; 370/480; 455/447
(58) Field of Search ................................ 370/343, 480, 370/344, 209, 203, 208; 455/447

(56) References Cited

U.S. PATENT DOCUMENTS

| | | | |
|---|---|---|---|
| 5,649,292 A | * | 7/1997 | Doner .......................... 455/447 |
| 5,867,478 A | | 2/1999 | Baum et al. |
| 5,956,642 A | | 9/1999 | Larsson et al. |
| 6,151,512 A | * | 11/2000 | Chheda et al. ............ 455/562.1 |
| 6,154,654 A | * | 11/2000 | Mao ............................. 455/446 |
| 6,405,044 B1 | * | 6/2002 | Smith et al. ................. 455/447 |
| 6,556,551 B1 | * | 4/2003 | Schwartz ..................... 370/331 |

OTHER PUBLICATIONS

Auer, Dammann, Sand, and Kaiser, "On pilot–symbol aided channel estimation for MC–CDMA in the presence of cellular Interference" 4th International Workshop on Multi–Carrier Spread–Spectrum (MC–SS 2003), Oberpfaffenhofen, Germany Sep. 2003 pp.: 39–48.*
Wang, Zhaocheng and Stirlin–Gallacher, R.A. "Frequency reuse scheme for cellular OFDM systems" Electronics Letters ,vol.: 38 , Issue: 8 , Apr. 11, 2002 pp.:387–388.*

* cited by examiner

*Primary Examiner*—Hassan Kizou
*Assistant Examiner*—Brian Roberts
(74) *Attorney, Agent, or Firm*—Frommer Lawrence & Haug LLP; William S. Frommer

(57) ABSTRACT

The present invention relates to a cellular communication system for wireless telecommunication on the basis of an OFDM scheme, comprising a plurality of base stations B, whereby at least one base station B is allocated to each cell C of the communication system and whereby information communicated from the base stations comprises data parts and pilot parts. The present invention further relates to a method for operating such a cellular communication system. The present invention is characterised in that the frequency reuse factor of the data parts is different from a frequency reuse factor of the pilot parts. Hereby, an optimisation between high capacity and reliable and correct channel estimation on the basis of the pilot parts can be achieved.

6 Claims, 2 Drawing Sheets

FREQUENCY REUSE SCHEME FOR OFDM SYSTEM

The present invention relates to a cellular communication system for wireless telecommunication on the basis of an orthogonal frequency division multiplex (OFDM) scheme and a method for operating such a cellular communication system.

A cellular communication system for wireless telecommunication is communicating information between base stations and mobile terminals on the basis of a cellular scheme, according to which the entire communication area of the communication system is divided into cells. In most cellular communication systems, each cell has an allocated base station which communicates with respectively active mobile terminals within that cell. However, in some cellular communication systems, more than one base station is allocated to each cell. Most present and future cellular wireless communication systems aim at a wireless communication with very high data rates. A typical wireless communication scheme providing a high data rate is an orthogonal frequency division multiplex (OFDM) system, in which the entire frequency band is subdivided into frequency subcarriers, whereby respectively adjacent frequency subcarriers are orthogonal to each other. Hereby, wireless communication with a very high data rate can be achieved and a dynamic frequency allocation can be realised.

Figure 3:
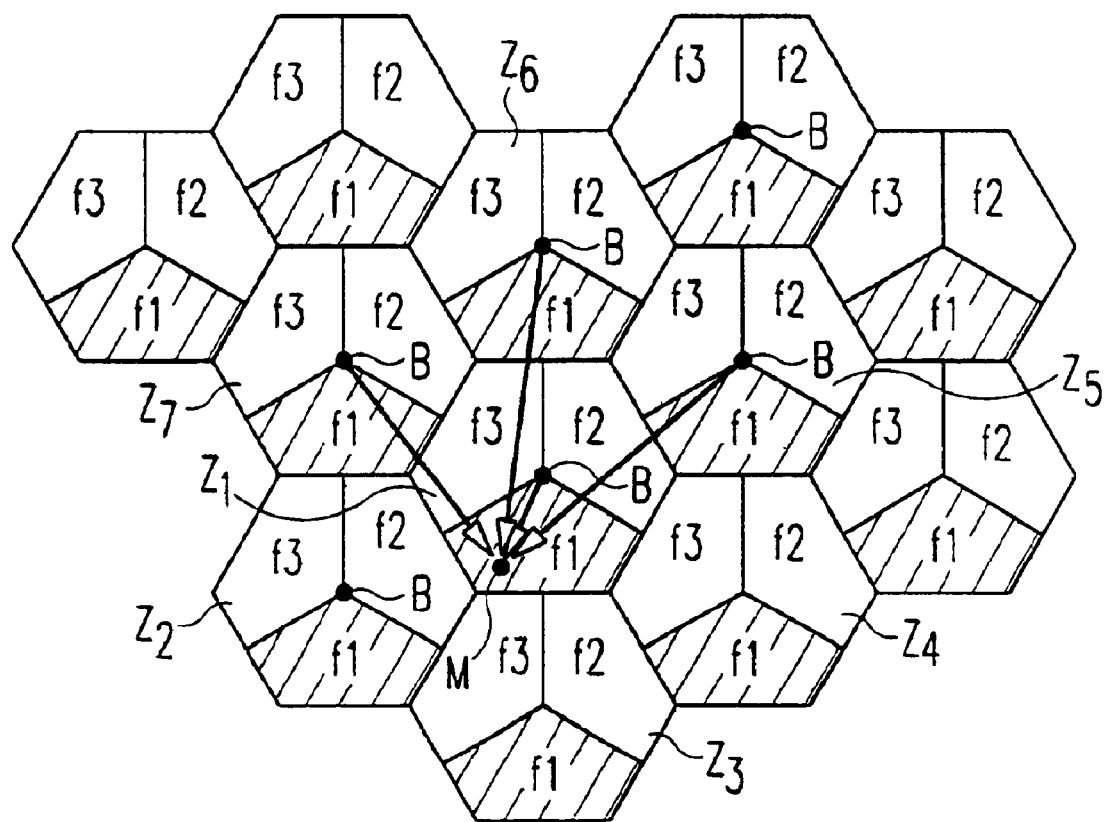

In FIG. 3, a typical wireless cellular OFDM communication system is shown, which comprises a plurality of cells $Z_1, Z_2, Z_3, \ldots$ and a plurality of base stations B, whereby each base station B is allocated to one of the cells $Z_1, Z_2, Z_3, \ldots$. Each base station B within each cell communicates with the respective active mobile terminals within the cell area. In the wireless cellular OFDM system shown in FIG. 3, the frequency reuse factor is three, FRF=3, where the frequency reuse factor is relevant to the frequency reuse distance. (If the frequency reuse factor is increased, the frequency reuse distance is also increased, and vice versa, its definition is as follows:

$$FRF = \frac{\text{entire frequency band}}{\text{frequency band allocated to one cell}} \times$$

number of sectors per cell for data part.

The entire frequency band of the OFDM system is divided into three frequency subbands f1, f2, f3. For example, each of the frequency subbands f1, f2, f3 uses one third of the entire frequency band available in the OFDM system. Each cell $Z_1, Z_2, Z_3, \ldots$ is divided into three sectors, whereby in each of the three sectors in each cell one of the frequency subbands f1, f2 or f3 is used. In other words, within one cell $Z_1, Z_2, Z_3, \ldots$ each subband f1, f2, f3 is used, whereby each of the subbands is used within one of the three sectors of the cell (FRF=3). Hereby, the base station within one cell is located in the center of the cell and operates all three frequency subbands f1, f2 and f3. Alternatively, the base station could consist of three different parts, each part operating the respective frequency subband in the respective sector. In both cases directional antennas are used in the base station, so that, if the base station is located in the center of the cell, each of the sectors is operated by means of directed antennas so that e.g. the base station B in the cell $Z_1$ transmits information within the respective frequency subband only in one out of three directions. The allocation order of the frequency subbands to the respective sectors is so that adjacent sectors never have the same allocated frequency subband. The wireless cellular OFDM system shown in FIG. 3 has e.g. cells with hexagonal shapes. Each hexagonal cell $Z_1, Z_2, Z_3, \ldots$ is divided in three sectors, each sector having a different one of the frequency subbands f1, f2, f3 allocated thereto. Considering e.g. the mobile terminal M located in the frequency band f1 sector of cell $Z_1$. The frequency subband f1 sector is, in the example shown in FIG. 3, the lowest sector in each of the cells. Thus, the mobile terminal M is allocated to and communicates with the base station B of the cell $Z_1$ in the frequency subband f1, but, due to the antenna directivity, may also receive disturbing signals from the base stations B of the neighbouring cells $Z_5, Z_6$ and $Z_7$. These disturbing or interfering signals within the same frequency band f1 from base stations B of the neighbouring cells have negative effect on the communication performance and quality. Particularly for the channel estimation, interference from neighbouring cells is very negative. In wireless cellular OFDM systems, channel estimation is usually performed on the basis of pilot patterns. These pilot patterns are transmitted from a base station to the respectively active mobile terminal, which performs a channel estimation on the received pilot pattern. In the presence of interference from neighbouring cells, the received pilot pattern is disturbed by interference and an accurate and correct channel estimation cannot be performed.

A wireless cellular OFDM system as shown in FIG. 3 is e.g. described in U.S. Pat. No. 5,867,478. This document proposes a new scheme realising a frequency reuse factor of three for a coherent cellular wireless OFDM system. In the proposed system, a reliable channel estimation can be achieved by using orthogonal Walsh functions to alleviate the effect of co-channel interference, e.g. from neighbouring cells. Thereby, the information communicated between the base stations and the mobile terminals comprises data parts and pilot parts, whereby the pilot parts received by the mobile terminals are used for channel estimation. The entire information, i.e. data parts and pilot parts, are transmitted according to the three sector frequency reuse pattern shown in FIG. 3. Interference from neighbouring cells in respect of the pilot patterns is avoided by using Walsh coding for the pilot patterns and by increasing the cyclically extended guard interval to maintain the orthogonality of the pilot patterns in respect to the pilot patterns from the three neighbouring cells, as e.g. cell $Z_1$ in respect of the three neighbouring cells $Z_5, Z_6$ and $Z_7$ in FIG. 3. Thereby, the length of the pilot patterns may be variable, so that the ratio of the bandwidth allocated for pilot parts to the whole bandwidth allocated for both data part and pilot part may also be variable. However, the frequency reuse factor for pilot parts and data parts is the same. The data parts and the pilot parts are communicated in the same frequency subband f1, f2 or f3 in each sector. Further, the wireless cellular OFDM system proposed in U.S. Pat. No. 5,876,478 can only be used in an synchronous cellular system, in which each OFDM transmitter is synchronised to a reference, whereby the reference is derived from a common source.

The object of the present invention is to provide a cellular communication system for wireless telecommunication on the basis of an orthogonal frequency division multiplex (OFDM) scheme according to the preamble of claim 1 and a method for operating such a cellular communication system according to the preamble of claim 5, which allow a more accurate and correct channel estimation for coherent data demodulation.

The above object is achieved by a cellular communication system for wireless telecommunication on the basis of an OFDM scheme, comprising a plurality of base stations, whereby at least one base station is allocated to each cell of the communication system and whereby information transmitted and received from said base station comprises data parts and pilot parts, characterised in, that a frequency reuse factor of the data parts is different from a frequency reuse factor of the pilot parts.

The above object is further achieved by a method for operating a cellular communication system for wireless telecommunication on the basis of an OFDM scheme, whereby information communicated within the cells of the communication system comprises data parts and pilot parts, characterised in, that a frequency reuse factor of the data parts is different from a frequency reuse factor of the pilot parts.

The present invention thus enables to freely choose and adapt the reuse factors of the data parts and the pilot parts independent from each other so that the transmission structure can be chosen to minimise interference from neighbouring cells so that a correct and accurate channel estimation can be performed.

Further, the cellular communication system and method for operating such a communication system according to the present invention can be used in any wireless cellular OFDM system, i.e. synchronous as well as asynchronous communication systems without any restriction. An asynchronous system is a system in which no common source is used so that the entire cellular system can be built cheaper and has wider application areas as compared to a synchronous system.

Advantageously, the frequency reuse factor of the data parts is smaller than the frequency reuse factor of the pilot parts. A high frequency reuse factor means a low data transmission capacity of the wireless communication system, but a very low interference between neighbouring cells. A low frequency reuse factor means a higher data transmission capacity, but also a higher interference between neighbouring cells. Hereby, the pilot parts are transmitted with a low data transmission capacity but also with a very low interference from neighbouring cells. Thus, a very accurate and correct channel estimation can be performed on the basis of these pilot patterns. On the other hand, the data patterns are transmitted with a higher data capacity but with more interference than the pilot parts.

Further advantageously, the frequency reuse factor of the data parts is three and the frequency reuse factor of the pilot parts is nine.

Figure 1:
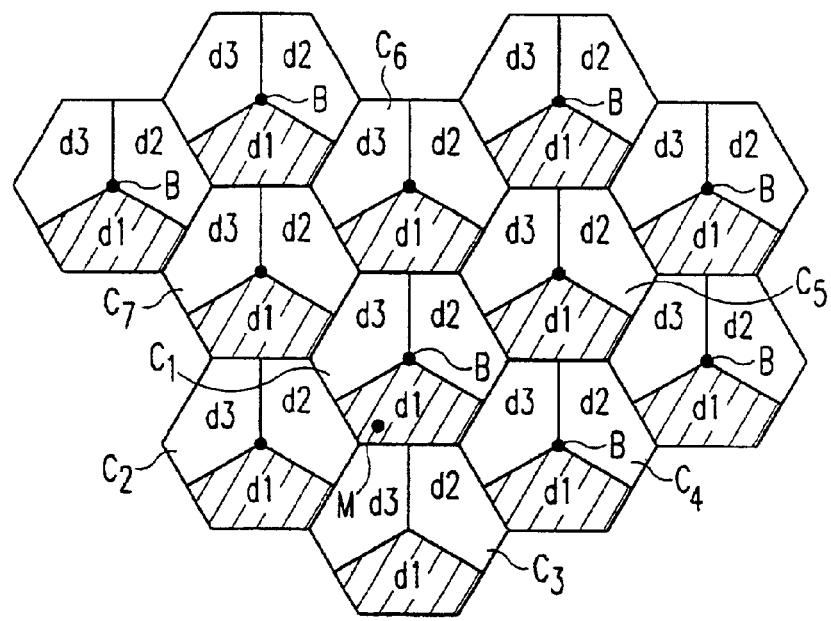
Figure 2:
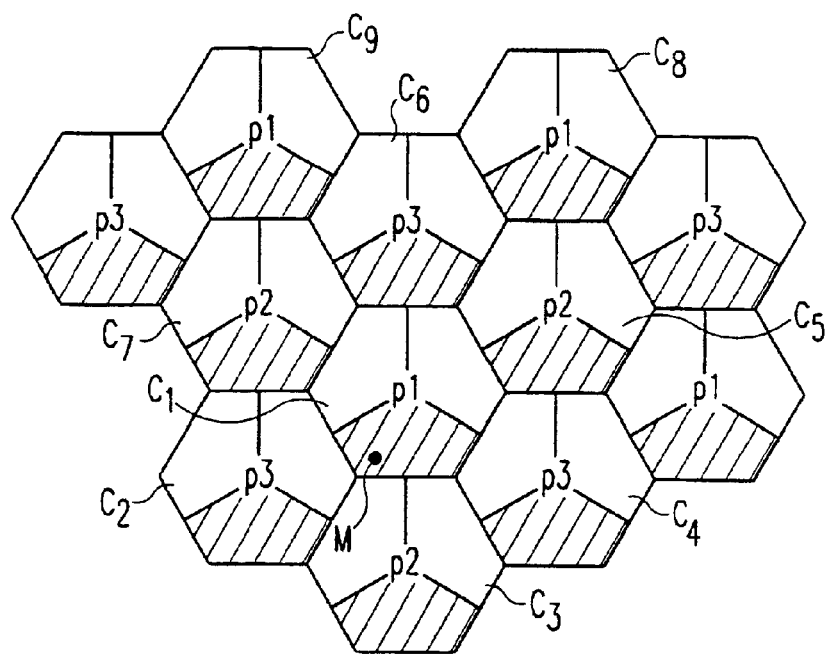

In the following description, the present invention is explained in more detail in relation to the enclosed drawings, in which FIG. 1 shows a cellular communication system according to the present invention with an example of a frequency reuse pattern for the data parts, FIG. 2 shows the cellular communication system of FIG. 1 with an example of a frequency reuse pattern for the pilot parts, and FIG. 3 shows a known cellular communication system having the same frequency reuse pattern for data parts and pilot parts.

FIG. 1 shows a cellular communication system for wireless telecommunication on the basis of an OFDM scheme according to the present invention. The communication system comprises a plurality of base stations B, whereby at least one base station B is allocated to each cell C of the communication system. In the example shown in FIG. 1, a single base station B is allocated to each cell and the cells generally have a hexagonal shape so that each cell has six neighbours, e.g. the cell $C_1$ has six neighbouring cells $C_2$, $C_3$, ..., $C_7$. The information communicated between the base stations B and respectively active mobile terminals in each cell comprise data parts and pilot parts, whereby the pilot parts are used for channel estimation in the mobile terminals. The cellular communication system according to the present invention, an example of which is shown in FIG. 1, is an orthogonal frequency division multiplex system, in which the entire frequency band is subdivided in frequency subcarriers, whereby respectively adjacent frequency subcarriers are orthogonal to each other.

The example of the cellular communication system according to the present invention shown in FIG. 1 explains the frequency reuse pattern for the data parts communicated from the respective base stations B. Each cell $C_1$, $C_2$, $C_3$, ... is divided into three sectors. The entire frequency band of the wireless cellular OFDM system is also divided into three subbands. In each of the sectors of each cell, a different one of the three subbands is used for the data communication. In the example shown in FIG. 1, the lower sector of each cell $C_1$, $C_2$, $C_3$, ... designated by d1 is allocated to a first frequency subband. The upper right sector d2 of each cell is allocated to a second frequency subband, and the upper left sector d3 of each cell is allocated to a third frequency subband. Adding the first, the second and the third frequency subband gives the entire frequency band used in the OFDM system. The example shown in FIG. 1 only relates to the data parts transmitted from the base stations B. In other words, data parts exchanged between a base station B and a mobile terminal M in the first sector d1 of the cell $C_1$ are transmitted within the first frequency subband. Here, the frequency reuse pattern shown in FIG. 1 is only valid for the data parts. It has to be noted, that the frequency reuse pattern shown in FIG. 1 generally corresponds to the frequency reuse pattern shown in FIG. 3. However, the pattern shown in FIG. 1 only applies to the transmission of the data parts, whereby the pattern shown in FIG. 3 relates to the transmission of both the data parts and the pilot parts.

A frequency reuse pattern for the pilot patterns according to the present invention is explained in relation to FIG. 2. FIG. 2 shows the cellular wireless OFDM communication system of FIG. 1 with the frequency reuse pattern of the pilot parts. The general construction of the cells in the system corresponds to the one shown in FIG. 1. However, in contrast to the transmission of the data parts, the pilot patterns are transmitted only within one of the three frequency subbands in an entire cell. For example, in the cell $C_1$, pilot patterns are only transmitted within the first frequency subbands denoted as P1 across all three sectors. All the adjacent cells $C_2$, $C_3$, ..., $C_7$ use a respectively different frequency subband for the transmission of the pilot patterns. For example, adjacent cells $C_3$, $C_5$ and $C_7$ use the second frequency subband for the transmission of the pilot parts and the other adjacent cells $C_2$, $C_4$ and $C_6$ use the third frequency subband for the transmission of the pilot parts. The division of the entire frequency band for the pilot parts is therefore the same as for the data parts. However, the frequency reuse pattern which defines the allocation of frequency subbands to the respective cells, is different for the data parts and for the pilot parts. For example, the base station of the cell $C_1$ transmits data parts of the first frequency subband in the lowest sector, data parts within the second frequency subband in the upper right sector and data parts within the third frequency subband in the upper left sector d3. However, the same base station B of the cell $C_1$ transmits pilot parts within the first frequency subband in all three sectors d1, d2 and d3. Thus, interference in respect of the transmission of the pilot parts is significantly reduced, since between two cells having the same allocated frequency subband for the pilot parts, as e.g. cells $C_1$ and $C_8$, are always at least one cell spaced apart from each other. In respect to the pilot patterns, the cells adjacent to the cell $C_1$ only transmit the pilot parts and thus energy within the second and the third frequency subband. Thus, at least a low interference or even a interference free channel estimation can be performed on the basis of the pilot parts in each cell. Since for the transmission of the data parts each cell is divided into three sectors having different frequency subbands allocated thereto, the data transmission capacity of the system according to the present invention is higher than the pilot part transmission capacity. Thus, interference effects tend to be higher in respect to the transmission of the data parts than the pilot parts. However, a very reliable and accurate channel estimation for coherent OFDM demodulation in a receiving terminal, such as mobile terminal M, is achieved.

The example of a wireless cellular OFDM communication system according to the present invention shown in FIGS. 1 and 2 has a frequency reuse factor of 3 for the data parts and a frequency reuse factor of 9 for the pilot parts. The frequency reuse factor depends,on the number of frequency subbands into which the entire frequency band of the system is divided, and on how many of the frequency subbands are used within one cell. For example, for the data part frequency reuse pattern shown in FIG. 1, the number of frequency subbands of the entire frequency band is three and the number of the frequency subbands used in each cell for the transmission of the data parts is also three. The frequency reuse factor can than be calculated as FRF=3. The frequency reuse pattern for the pilot parts of the same system shown in FIG. 2 corresponds to a frequency reuse factor of FRF=9, since only one frequency subband is used within each cell. The chosen numbers of three and nine for the frequency reuse factors of the data parts and the pilot parts, respectively, are a mere example and any other number may be used depending on the particular conditions of the system. However, for a wireless cellular OFDM system with a similar or the same cellular structure as shown in FIGS. 1 and 2, these numbers are advantageous in view of the accurate and correct channel estimation on one side and the high data rate transmission on the other side.

What is claimed is:

1. Cellular communication system for wireless telecommunication on the basis of an orthogonal frequency division multiplex (OFDM) scheme, comprising a plurality of basestations (B), whereby at least one basestation (B) is allocated to each cell (C) of the communication system and whereby information communicated from said basestation comprises data parts and pilot parts, characterized in, that a frequency reuse factor of the data parts is different from a frequency reuse factor of the pilot parts.

2. Cellular communication system according to claim 1, characterized in, that the frequency reuse factor of the data parts is smaller than the one of the pilot parts.

3. Cellular communication system according to claim 1, characterized in, that the frequency reuse factor of the data parts is 3 and the one of the pilot parts is 9.

4. Method for operating a cellular communication system for wireless telecommunication on the basis of an orthogonal frequency division multiplex (OFDM) scheme, whereby information communicated within the cells of the communication system comprises data parts and pilot parts, characterized in, that a frequency reuse factor of the data parts is different from a frequency reuse factor of the pilot parts.

5. Method for operating a cellular communication system according to claim 4, characterized in, that the frequency reuse factor of the data parts is smaller than the one of the pilot parts.

6. Method for operating a cellular communication system according to claim 4, characterized in, that the frequency reuse factor of the data parts is 3 and the one of the pilot parts is 9.

* * * * *

UNITED STATES PATENT AND TRADEMARK OFFICE
CERTIFICATE OF CORRECTION

PATENT NO. : 6,917,580 B2 Page 1 of 1
APPLICATION NO. : 09/919263
DATED : July 12, 2005
INVENTOR(S) : Zhaocheng Wang et al.

It is certified that error appears in the above-identified patent and that said Letters Patent is hereby corrected as shown below:

Title Page, Under (75) Inventors: change

"Thomas Dolle"

to

--Thomas Dölle--

Signed and Sealed this

Fifteenth Day of January, 2008

JON W. DUDAS
*Director of the United States Patent and Trademark Office*